Nov. 21, 1967 J. H. HOLLOWAY ET AL 3,354,307
ATOMIC BEAM RESONANT DEVICE WITH A CAVITY RESONATOR
HAVING TWO ARMS AND A LEG PORTION
CONTAINING LOSSY MATERIAL
Filed Jan. 28, 1964 3 Sheets-Sheet 1
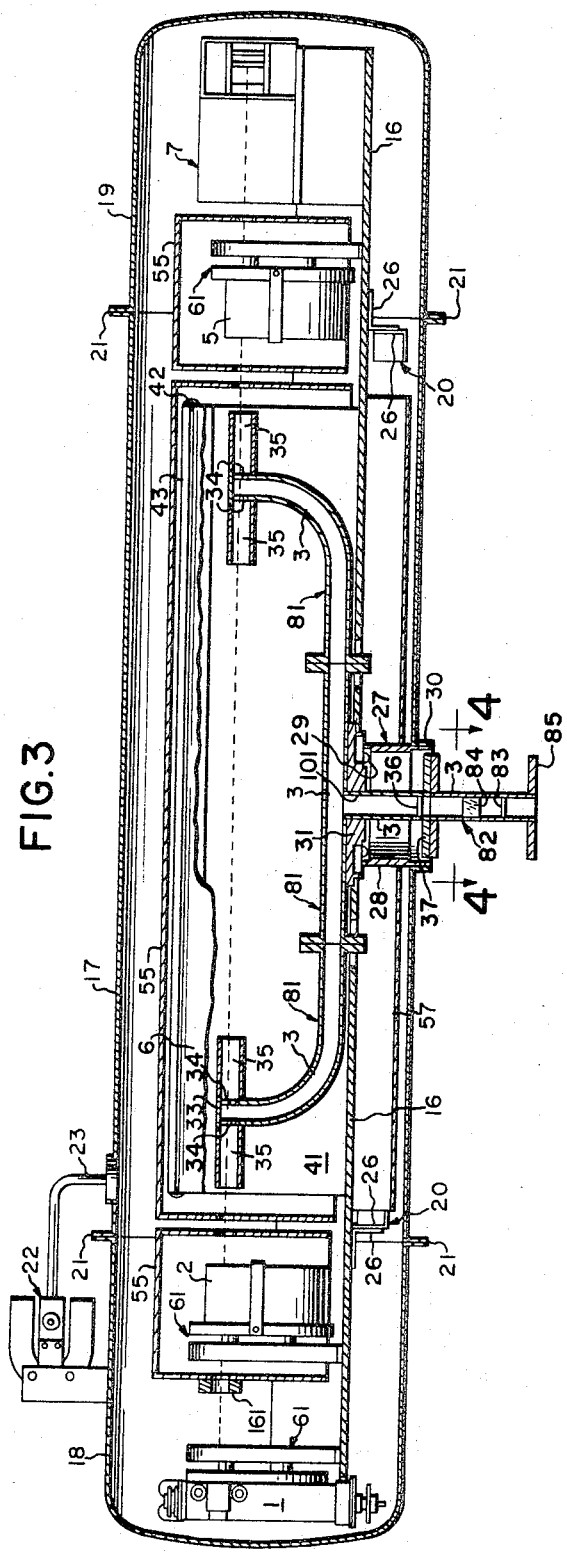
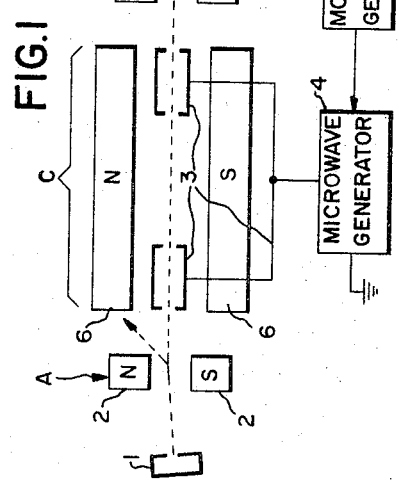
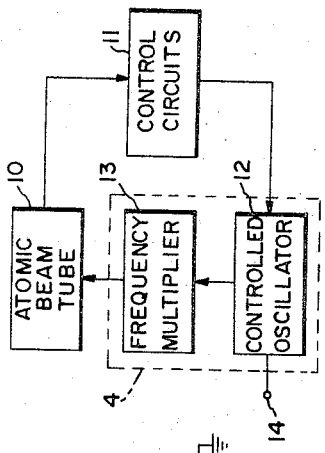
INVENTORS
JOSEPH H. HOLLOWAY
ROBERT J. RORDEN
BY *Harry E. Aine*
ATTORNEY Nov. 21, 1967  J. H. HOLLOWAY ET AL  3,354,307
ATOMIC BEAM RESONANT DEVICE WITH A CAVITY RESONATOR
HAVING TWO ARMS AND A LEG PORTION
CONTAINING LOSSY MATERIAL
Filed Jan. 28, 1964  3 Sheets-Sheet 2

INVENTORS
JOSEPH H. HOLLOWAY
ROBERT J. RORDEN

BY *Harry E. Aine*

ATTORNEY

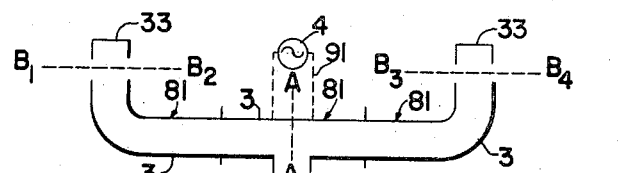
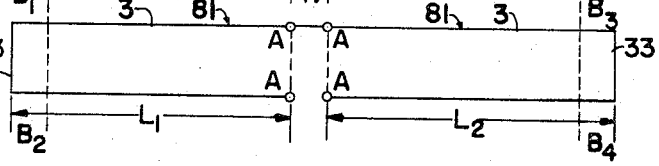
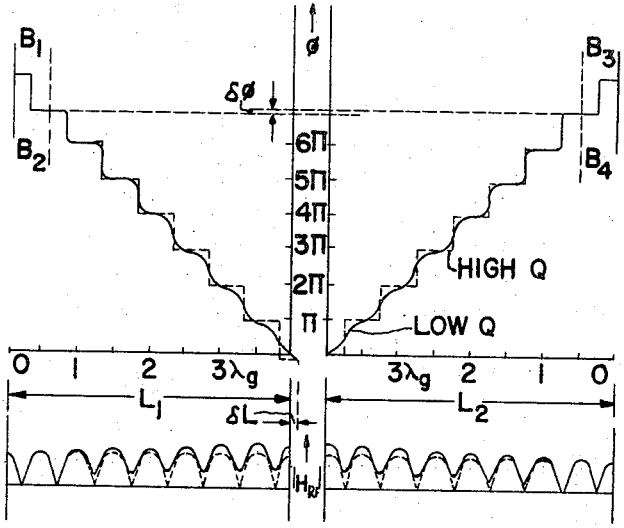
PHASE RELATIONSHIPS IN INTERACTION STRUCTURE
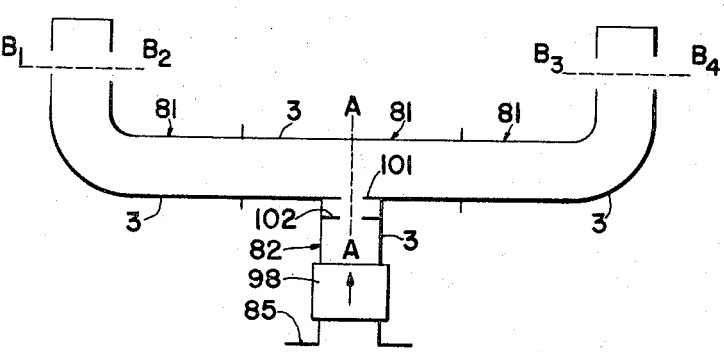
INVENTORS
JOSEPH H. HOLLOWAY
ROBERT J. RORDEN
BY *Harry E. Aine*
ATTORNEY

United States Patent Office 3,354,307
Patented Nov. 21, 1967

3,354,307
ATOMIC BEAM RESONANT DEVICE WITH A CAVITY RESONATOR HAVING TWO ARMS AND A LEG PORTION CONTAINING LOSSY MATERIAL
Joseph H. Holloway, Topsfield, Mass., and Robert J. Rorden, Palo Alto, Calif., assignors, by mesne assignments, to Hewlett-Packard Company, Palo Alto, Calif., a corporation of California
Filed Jan. 28, 1964, Ser. No. 340,767
7 Claims. (Cl. 250—41.3)

ABSTRACT OF THE DISCLOSURE

An atomic beam frequency standard has a cavity resonator which is rendered less sensitive to temperature changes by loading the microwave energy feed arm of the resonator with lossy material. Although this substantially lowers the Q of the entire cavity taken as a whole it still maintains a high Q for the beam field interaction portion of the cavity whereby desired fixed phase relationships are maintained.

---

The present invention relates in general to atomic resonant devices and more particularly to an improved cavity resonator for use in such atomic resonant devices such that desired phase relationships may be obtained in a cavity resonator which is capable of operating over a relatively wide range of temperatures without suffering substantial detuning effects. The cavity resonator of the present invention is especially useful in atomic beam tubes such as atomic beam frequency standards to render same insensitive to changes in the physical dimensions of the cavity resonator when the resonator is subjected to relatively wide temperature fluctuations and/or errors in manufacturing tolerances.

Heretofore, atomic beam frequency standard tubes have been made which have employed a Y-shaped cavity resonator to obtain interaction between the fields of the resonator and a beam of atomic particles passing therethrough. (See U.S. Ser. No. 233,573, filed Oct. 29, 1962, now issued as U.S. Patent 3,323,008.) The interaction regions of the Y-shaped cavity are provided in the end portions of the two arms of the Y and R.F. power is fed into the base leg of the Y-shaped cavity.

The problem encountered with the prior art cavity was that the entire cavity had a high loaded Q as of, for example, 4000 in order to maintain a desired phase relationship of the fields within the entire cavity. The result was that relatively small changes in the ambient as of, for example, 8° centigrade, resulted in substantial detuning of the high Q resonator from the desired operating frequency such that the field strength of the resonator at the interaction regions was substantially reduced as to 0.7 of the tuned value as the resonator was driven from a relatively fixed frequency source. The reduction in cavity field strength produced a reduction in the intensity of the output signal thereby reducing the signal to noise ratio and causing the frequency control servo mechanisms to hunt thereby producing a noisy and unstable frequency standard output signal.

In a preferred embodiment of the present invention, an improved cavity resonator is provided wherein preferably the feed arm portion of the resonator is provided with loss to thereby lower the Q of the entire resonant cavity as by, for example, a factor of 5 to 30 to render same less sensitive to detuning caused by temperature fluctuations while maintaining a high Q for the beam field interaction portion of the cavity whereby desired fixed phase relationships are maintained in the high Q portion containing the interaction regions. With the improved cavity resonator design, a cesium beam frequency standard has been rendered substantially non-responsive to cavity temperature fluctuations over a range of temperature deviation of ±40° centigrade whereas the prior art frequency standards utilizing the prior high Q cavity design had the same temperature stability only over a range of ±8° centigrade.

The principal object of the present invention is to provide an improved cavity resonator for atomic resonant devices having improved stability whereby the atomic resonant device is rendered less sensitive to fluctuations of the ambient and/or manufacturing tolerances.

One feature of the present invention is the provision of a cavity resonator for interaction with atomic resonant particles, the cavity having a first low loss or high Q portion containing therewithin an interaction region wherein the fields of the first resonator portion interact with the atomic particles to produce atomic resonance thereof, and the resonator including a second lossy portion wherein energy is fed into the first portion at or through the lossy portion. The lossy portion of the resonator is made substantially more lossy than the first or interaction portion whereby the total Q of the cavity including the first and second portions is substantially reduced as compared to the Q of the first or interaction cavity portion whereby substantially fixed phase relations are maintained throughout the first cavity portion over a relatively wide range of manufacturing tolerances and the cavity fields are rendered less sensitive to cavity detuning.

Another feature of the present invention is the same as the preceding feature wherein the cavity resonator is of generally a Y-shape, two arms of the Y having high Q and providing a pair of spaced apart interaction regions for interaction between the field of the high Q resonator portions and the atomic particles to produce atomic resonance thereof, and wherein the base leg of the Y-shaped cavity contains sufficient loss to substantially reduce the Q of the total resonator as compared to the Q of the first two arm portions.

Another feature of the present invention is the same as either one of the preceding features in combination with means for producing and projecting a beam of atomic particles over an elongated beam path and a detector at the terminal end of the beam path for detecting resonance of the beam. The aforementioned cavity being disposed intermediate the beam forming and detecting means for exciting resonance of the beam of particles passable therethrough whereby the atomic beam tube is rendered relatively insensitive to temperature fluctuations of the cavity.

Other features and advantages of the present invention will become apparent upon a perusal of the specification taken in connection with the accompanying drawings wherein:

FIG. 1 is a schematic drawing of an atomic beam tube,

FIG. 2 is a schematic block diagram of an atomic beam tube as used for a frequency standard, FIG. 3 is a longitudinal view, partly in section, of the atomic beam tube of the present invention.

Figure 4:
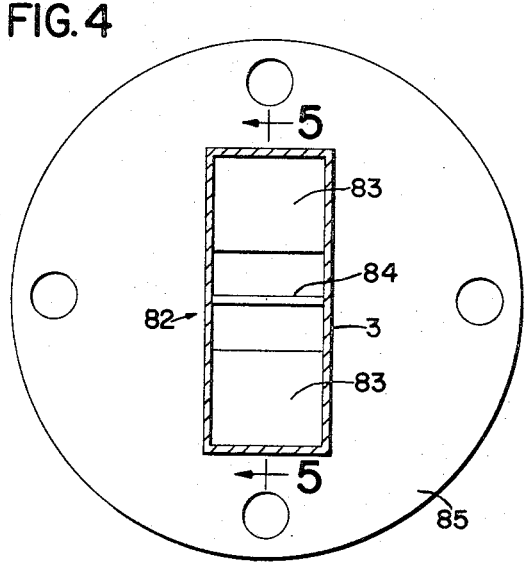
FIG. 4 is an enlarged cross-sectional view of a portion of the structure of FIG. 3 taken along lines 4—4 in the direction of the arrows.
Figure 5:
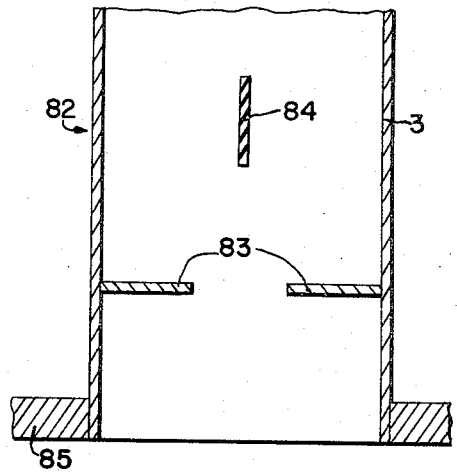
Figure 6:
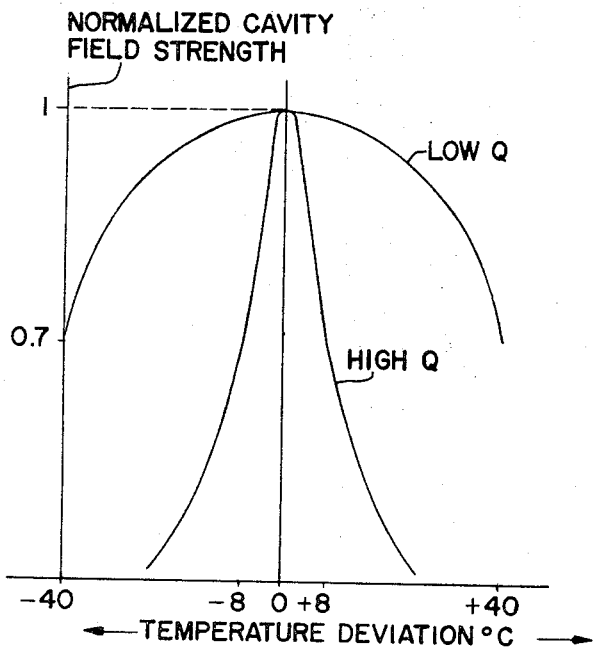
Figure 7:
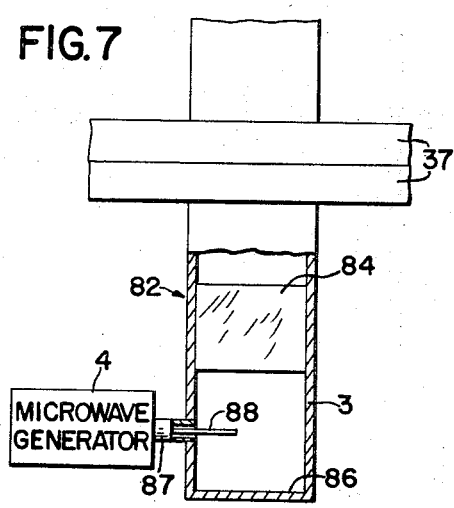

FIG. 5 is a cross-sectional view of a portion of the structure of FIG. 4 taken along lines 5—5 in the direction of the arrows, rotated counter clockwise 90°, FIG. 6 is a plot of normalized cavity field strength versus temperature deviation in degree C for a typical prior art high Q cavity and the improved low Q cavity of the present invention, FIG. 7 is an alternative embodiment of the feed arm portion of the low Q cavity as depicted in FIGS. 4 and 5 of the present invention, FIG. 8(a) is a schematic circuit diagram of a waveguide cavity resonator structure of the present invention, FIG. 8(b) is an equivalent two-wire line circuit for the interaction arm portions of the cavity of FIG. 8(a), FIG. 8(c) is a graph of phase shift $\phi$ as a function of distance in the interaction arms of FIG. 8(a) and (b), FIG. 8(d) is a plot of R.F. magnetic field intensity versus distance in the interaction arm portions of the waveguide cavity of FIGS. 8(a) and (b), and FIG. 9 is a schematic circuit diagram of an alternative waveguide cavity resonator structure of the present invention.

Referring to FIGS. 1 and 2 a brief description of a cesium beam tube will be given. The interaction in the cesium atom which is involved occurs between the nuclear magnetic dipole and the magnetic dipole of the valence electron. As in the case of two ordinary bar magnets, the potential energy of the system depends on the relative orientation of the magnetic dipoles. In nature, only two stable configurations of the cesium atom exists, those in which the dipoles are parallel or anti-parallel, corresponding to two allowed quantum states. To change from one state to the other, an amount of energy equal to the difference in energy of orientation must be either given to or taken from the atom. Since all cesium atoms are identical, E is the same for every atom. A convenient way to supply the energy is by means of microwave radiation of frequency $f$, where $f$ is related to E through the Planck equation. $E=hf$, where $h$ is Planck's constant. No other frequency will cause a transition. Thus, $f$ is the resonance frequency associated with cesium.

To make use of the resonance, one makes use of the fact that the direction of the force experienced by a cesium atom in a strong inhomogeneous magnetic field depends on the state of the atom. Atoms in one state will be deflected into stronger fields and atoms in the other state will be deflected into weaker fields. Thus, magnets can be used for state selectors for a beam of cesium atoms.

A beam of atomic particles, equally populated by atoms of both states, is produced by the cesium beam source 1, hereinafter, referred to as the oven. Atoms of one state with either parallel or antiparallel alignment of the electron and nuclear magnetic dipoles, are selected by a first state selector magnet 2 or A-field magnet and are deflected through an oscillating microwave magnetic field in a microwave structure 3 powered from a microwave generator 4 and thence through a second state selector magnetic field hereinafter referred to as the B-field produced by state selector magnet 5. A weak uniform magnetic field is applied over the central region of the beam path in the presence of the microwave magnetic field by means of a suitable electro-magnet 6 hereinafter referred to as the C-field magnet. The field strength in the C-field region is approximately $\frac{1}{20}$ of a gauss to afford some separation between the energy sublevels of the atom. The C-field intensity is controlled to 3% to realize a frequency accuracy of 1 part in $10^{11}$.

If the frequency of the microwave oscillating magnetic field equals the atomic resonance frequency, the atom changes states and is subsequently deflected into a detector target 7. Otherwise the atom does not resonate or change state and follows a trajectory which misses the detector 7. Hence, presence of an atom current at the detector 7 indicates the signal frequency injected via generator 4 was equal to the resonance frequency, which in the case of the cesium atom is about 9,192.631770 megacycles.

The frequency of the generator 4 is modulated about its center frequency by provision of a modulation generator 8 serving to modulate the microwave generator 4 at a suitable low frequency or audio frequency rate of 100 c.p.s. thereby modulating the output atom current at detector 7 at this frequency. The detector output signal may then be fed to the vertical plates of an oscilloscope 9 and displayed as a function of the modulation generator frequency applied to the horizontal plates of the oscilloscope 9 to produce the characteristic resonance line signal.

The cesium beam tube acts as a passive resonator with a maximum response at the cesium resonance frequency and a Q typically between $10^7$ and $10^8$.

To lock an oscillator to the resonance, a system as shown in FIG. 2 is employed. More specifically, output of the atomic beam tube 10 is fed to suitable control circuits 11 to produce a suitable error output signal which is applied to a controlled crystal oscillator 12 which is precisely controlled by the error signal to maintain the microwave frequency applied to the tube 10 via a suitable frequency multiplier chain 13, at the resonance frequency. Multiplier chain 13 and the controlled oscillator 12 form the microwave generator 4.

An output signal is derived from the controlled oscillator 12 at terminal 14. An output at any desired frequency may be synthesized from the output signal at terminal 14. Either output signal is stable to 1 part in $10^{11}$ for the lifetime of the atomic beam tube 10.

The construction of the present invention will be described in greater detail with reference to FIGS. 3–7. The beam determining elements including the oven 1, state selector magnets 2 and 5, the C-field magnet 6, microwave waveguide cavity 3, and detector 7, are all fixedly secured in an axially spaced apart relation to an axially directed unitary support channel 16 as of 304 stainless steel.

A three piece tubular vacuum envelope is formed by hollow cylindrical center section 17 and outwardly domed end hats 18 and 19, respectively. The tubular envelope structure is relatively rigid and is approximately 5 inches in diameter and made of approximately $\frac{1}{32}$ inch thick 304 stainless steel sheet. The tubular sections 17, 18 and 19 are joined together and vacuum sealed at their outwardly directed mating flange portions 21. The sections are sealed by heliarc welding together at their outer ends. The vacuum is maintained by an electrical getter ion vacuum pump 22 which continuously pumps the vacuum envelope in use via an exhaust tubulation 23.

The pump 22 serves to maintain a vacuum of approximately $10^{-7}$ mm. Hg during operation of the device to allow the beam atoms to pass from the source 1 to the detector 7 with extremely small probability of suffering a collision with a gas atom.

The beam support channel 16 is suspended within the vacuum envelope by two pairs of axially and transversely spaced tab assemblies 20 disposed inbetween the channel 16 and the center section 17 of the vacuum envelope. The tab assemblies 20 are each comprised of two quadrant shaped right angle brackets 26 carried on the channel 16 and center section 17 as by spot welding.

Axial restraint for the beam support channel 16 is provided via the intermediary of a centrally disposed support strucutre 27. The central support structure includes a hollow cylindrical member 28, as of 0.080 inch wall 304 stainless steel. The cylinder 28 is fixedly carried from the vacuum envelope 17 by being centered within a circulary pulled out sleeve portion of the envelope, the pulled out portion forming an outwardly directed cylindrical flange 30. The cylinder 28 and the flange 30 are fixedly secured and sealed together as by heliarc weld.

The cylinder 28 is radially inwardly directed from the center envelope section 17 and is fixedly secured to the channel 16 in the axial direction via the intermediary of a relatively thin-walled annular diaphragm 29 as of, for example, 403 Monel which is sealed between cylinder 28 and a strengthening disk 31 carried from the channel 16.

An X band waveguide structure 3 as of copper or silver plated 403 Monel passes through a rectangular central opening in the disc 31 and is brazed thereto to form a vacuum tight seal. The Y-shaped waveguide cavity structure 3 is provided with a T section for dividing the microwave power into the arms of the T extending in the axial direction of the tube and bending up to terminate at transversely directed conductive walls 33 closing off and shorting the ends of the X band guide 3 to form a Y-shaped waveguide cavity resonator having a pair of beam-field interaction arms 81 and a loss arm 82.

The shorted end portions of the arms 81 of the Y-shaped waveguide cavity 3 are provided with rectangular openings 34 in opposite walls of the guide in axial alignment with the beam path for passage of the beam through the cavity arms to provide a pair of spaced beam-field interaction regions. Short sections of the smaller K band guide 35 are fixed to the X band guide in axial alignment with the beam path and in registry with the rectangular openings 34. The K band guide sections 35 are cut off to the applied X band microwave power and thereby prevent escape of wave energy through the beam openings 34 into the spaces between the axially spaced cavity sections.

A conventional wave reflectionless vacuum tight window 36 is brazed across the X band guide 3 in the loss arm 82 near an input flange 37 thereby completing the vacuum envelope.

An inductive iris 83 (see also FIGS. 4 and 5) is disposed in the loss arm 82 to define another end wall of the Y-shaped waveguide cavity resonator 3. A lossy member 84 as of, for example, a resistive card extends between the broad walls and across the center of the waveguide 3 in the waveguide region between the window 36 and the iris 83 for substantially loading the loss arm portion 82 of the waveguide cavity 3. In a typical example at X band, the card is 0.002" thick, 0.400" long and 0.125" wide having a resistivity of 50 ohm per square. Wave energy from the microwave generator 4 is coupled into the waveguide loss arm 82 via flange 85 and iris 83.

Other alternative methods and devices may be used for loading the loss arm 82 of the cavity. Such loading alternatives include coating the walls of the guide 3 with lossy material such as "Aquadag," filling the guide with along dielectric material, etc.

The loss arm portion 82 of the resonator 3 is preferably very tightly or heavily coupled to the substantially lossless (Q>500) interaction arms 81 of the Y-shaped cavity 3 in order to substantially reduce the Q of the composite Y-shaped cavity 3. The degree of coupling between the waveguide loss arm 82 and the interaction arms is substantially greater than critically coupled as the waveguide junction is equivalent to a large iris 101. In a typical example, as aforementioned, the interaction arms 81 as loaded by the waveguide junction iris 101 have a Q of approximately 4000 whereas the total Q of the Y-shaped cavity, including the loss arm 82, has been reduced due to the lossy member 84 by a factor of 5 to approximately 800.

In a preferred embodiment the Q of the interaction arm portions 82 of the Y-shaped cavity are as high as possible to assure a desired phase relationship, more fully described below, within the entire beam-filed interaction cavity region. Any loss in the interaction arms 81 sets up running waves therein to supply power to the loss. The running waves within the interaction arms 81 produce relative phase shift within the interaction arms 81. The phase shift distorts the observed resonance of the atoms and results in a shift of the atomic resonance frequency.

However by lumping the loss, necessary to reduce the total Q of the Y-shaped resonator, in the loss arm 82 the running waves are confined to the loss arm portion 82 yielding desired fixed phase in the interaction arm portions 81.

Referring now to FIG. 6, there is shown a graph of normalized cavity field strength in the beam-field interaction region versus temperature deviation in ° C. for the prior high Q cavity (Q=4000) and the improved composite low Q cavity (Q=800). The 70% field strength points have been extended by the low Q cavity design to I 40° C. as opposed to I 8° C. for the high Q design. Therefore, the same output performance, previously obtained over ±8° C., is now obtained over a temperature range of I 40° C. Reducing the Q still further of the composite Y-shaped cavity will result in a commensurate extension of the useable temperature range. The novel reduced Q cavity design also improves frequency stability of the output signal by a factor of the square of the reduction in Q. For example, the previously described reduction in cavity by a factor of 5 improved the frequency stability of the output signal by a factor of 25 for the same amount of temperature deviation.

Referring now to FIG. 7, there is shown an alternative embodiment of the present invention. In this embodiment the iris 83 has been replaced by a conductive wall 86 closing off the end of the guide thereby forming the end wall of the Y-shaped cavity 3. Wave energy from the microwave generator 4 is fed into the loss arm 82 via a coaxial line 87 and conventional antenna probe 88 for exciting the waveguide cavity 3.

Referring now to FIG. 8, there is shown an equivalent circuit at (b) for the waveguide interaction arm portion 81 of the cavity resonator 3 shown at (a). In FIG. 8(c) there is shown the phase diagram for the standing wave pattern shown at (d) of the microwave magnetic fields within the interaction arm portions 81 of the waveguide cavity resonator 3. The dotted lines including the stair step wave pattern are for an interaction cavity portion 81 having infinitely high Q; and the solid lines of (c) and (d) are for moderately low Q interaction arm portions 81. Planes $B_1$–$B_2$ and $B_3$–$B_4$ define the beam-field interaction planes in the equivalent circuit. Plane A—A defines the center-plane of the waveguide junction between arms 81 and 82.

It is important that planes $B_1$–$B_2$ and $B_3$–$B_4$ have exactly the same phase or be exactly out of phase to prevent first order frequency shifts in the resonant frequency of the atomic resonance of the beam particles. Therefore, planes $B_1$–$B_2$ and $B_3$–$B_4$ are disposed substantially $n\lambda/2$ electrical wavelengths apart in the interaction cavity portion 81, where $n$ can have any integer value including zero. The higher the Q of the interaction cavity portion 81, the more latitude that is permitted in $n\lambda/2$ spacing between planes $B_1$–$B_2$ and $B_3$–$B_4$. However, the feed plane A—A positioning is more critical than the aforementioned spacing between planes $B_1$–$B_2$ and $B_3$–$B_4$. The feed point A—A is preferably midway between planes $B_1$–$B_2$ and $B_3$–$B_4$ and should correspond as closely as possible to an $n\lambda/2$ point away from both planes $B_1$–$B_2$ and $B_3$–$B_4$ since slight departures from such a point correspond to some finite value slope in the phase diagram (c).

Detuning of the total waveguide cavity 3, as by temperature produced changes in the dimensions of the cavity, introduces second order frequency shift in the atomic resonance frequency due to frequency pulling and also reduces resonance signal amplitude due to a reduction in cavity interaction field intensity as previously described. These detuning effects are reduced by the composite cavity including the high and low Q portions.

In the composite cavity configuration the microwave energy need not be applied to the lossy arm 82 in such a way that the wave energy passes through the loss on the way to the junction A—A of the arms 81 and 82. As an alternative the microwave energy from generator 4 is applied via an iris 83 or probe 88, previously described, disposed between plane A—A and the loss 84 or introduced at plane A—A. As another alternative the microwave energy is applied in another waveguide arm 91 coupled at junction plane A—A opposite waveguide arm 82 as shown in phantom lines in FIG. 8(a). In this latter case no running wave runs longitudinally of or in the interaction arms 81 in the space inbetween planes $B_1$–$B_2$ and $B_3$–$B_4$ but merely runs across the guide arms 81 to the loss arm 82.

Plane A—A need not be disposed midway between planes $B_1$–$B_2$ and $B_3$–$B_4$ but may be disposed at any one of the $n\lambda/2$ points in the interaction arms 81. However, such off center feed positioning makes the positioning of plane A—A more critical as to the plane $B_1$–$B_2$ or $B_3$–$B_4$ which is furtherest from plane A—A.

Referring now to FIG. 9 there is shown another alternative embodiment of the present invention. In this embodiment the lossy element 84 is replaced by an isolator 98. The isolator 98 is arranged such that microwave power supplied to the waveguide cavity 3 is not appreciably attenuated. However, reflected wave energy within the loss arm 82 of the cavity is attenuated in the isolator 98 sufficiently to reduce the Q of the entire cavity, including the interaction arms 81 and loss arm 82, to a Q substantially lower than the Q of the interaction arm portions 81. In this circuit the large waveguide junction iris 101 is preferably closed somewhat to reduce the degree of coupling between the loss arm portion 82 and the high Q interaction portion 81 in order to prevent excessive reduction of the total Q of the composite resonator 3 when a standard X-band isolator 98 is used having a reverse power loss of 30 db and a forward power loss of less than 0.5 db. With the isolator 98 the loss arm end wall of the waveguide resonator is defined by the isolator and resides somewhere within the isolator 98. As an alternative to closing up on the iris 101, when using the isolator 98, a second iris 102 is employed preferably disposed in the arm 82 near the first iris 101. Coupling to the isolator 98 is regulated by this second iris 102 and the coupling through the iris 102 is greater than critical coupling.

As used herein the term "cavity resonator" is defined to mean a resonant wave supporting structure having in use a voltage standing wave ratio greater than 5.

The C-field is provided by a C-field electromagnet 6 formed by an elongated U-shaped channel member 41. The channel member 41 is made of a good magnetic permeable material as of, for example, mumetal and is approximately 0.060 inch thick. The C-field magnet 6 is energized by a C-field coil 42 wound around the base of the channel 41 in the axial direction and retained in position by a pair of oppositely directed non-magnetic channel members 43. The C-field coil is made up of relatively few turns such as, for example, seven turns of 16 mil wire supplied with a relatively low DC current as of 20 milliamperes to produce the low uniform C-field of approximately 1/20 gauss.

A plurality of similarly U-shaped magnetic shield members 55 cover over the C-field magnet 6, A-field magnet 2, and the B-field magnet 5, respectively. Shields 55 are carried from the lip of the upright portions of channel 16 by a plurality of suitable spring loaded fastening devices. Shields 55 are made of a suitable magnetic permeable material such as, for example, Allegheny 4750 alloy, made relatively thin as, for example, 0.050 inch thick. The U-shaped channel shield members 55 are closed off at their ends via apertured transverse header members of the same material.

A magnetic permeable shield 57, made of the same material as shield 55, is disposed in mutually opposed relationship to shield 55 and carried from the outside of and below channel 16 via suitable clips and indexing blocks, not shown. The second magnetic shield 57 extends axially substantially the entire length of the C-field magnet 6. The upstanding legs of upper shield 55 and the lower shield 57 are disposed in overlapping relationship to completely surround the C-field magnet 6 with shielding members, thereby minimizing the amount of stray magnetic field extending into the C-field region whereby the homogeneity of the C-field is maintained.

A plurality of similar gimbal assemblies 61 are employed for securing the oven 1, and state selector magnets 2 and 5 respectively, to the support channel 16. The gimbals 61 are made of a relatively heavy gauge material to provide a rigid support. The gimbal members are also provided with deformable wall portions such that the elements mounted to the gimbal assembly may be changed in position for obtaining proper transverse alignment of the various elements after they have been mounted on the channel 16.

After passing the central region C, the atoms enter the deflecting B-field produced by the magnet 5, which has already been described. Only those atoms which have undergone a transition to the (4,0) state proceed in the proper direction to strike the detector 7. The function of the detector 7 is to change the incident atoms into a signal that is useable.

Suitable getter material and devices are strategically placed within the vacuum envelope for removing residual gas molecules and unused atomic beam material. More specifically, a bulk getter is formed by an antimony disc 161 (see FIG. 3) carried on the outside of the A-field shield 55 in alignment with the beam path. The disc 161 is centrally apertured for the passage of the beam therethrough and serves to getter unused beam material. Surface gettering is provided by a carbon coating applied to the inside of the domed envelope end hats 18 and 19, respectively, and to the surfaces of the magnetic shields 55 in the regions near the beam path. A suitable surface gettering material is formed by pulverized carbon suspended in a silicone binder and applied via an alcohol vehicle. Such a material is known as dispersion number 154 made by Acheson Colloids Company of Michigan. The beam tube construction used herein wherein the beam determining elements are surrounded by a separate vacuum envelope lends itself to this type of surface gettering since large surface areas are provided internal of the vacuum envelope for application of the getter material.

The atomic beam tube apparatus, previously described, is not limited to the cesium atom alone. Certain isotopes of other alkali metals such as, for example, thallium and rubidium may be used. Any electron or nuclear re-orientation transition in atoms or molecules for which the net atomic or molecular angular momentum $f$, is an integer or half-integer in quantum units of $h$ may be used. In general, it is contemplated that any molecular or atomic beam or other assemblage of atoms having desired transition characteristics may be used and the terms "atomic" or "atomic beam" as used herein is not intended to be limited to atoms or to a beam of atoms.

Since many changes can be made in the above construction and many apparently widely different embodiments of this invention could be made without departing from the scope thereof, it is intended that all matter contained in the above description or shown in the accompanying drawings shall be interpreted as illustrative and not in a limiting sense.

We claim:

1. An atomic resonant apparatus including: means for producing a beam of atomic particles, a first state selector, means for exciting atomic resonance of said particles, a second state selector, means for detecting resonance of said particles to produce a resonance signal, said exciting means including a cavity resonator for applying microwave electromagnetic energy to said particles to produce atomic resonance of said particles, said cavity resonator having a particle-field interaction portion comprising a pair of arms, said cavity resonator further having a lossy leg portion electrically tightly coupled to said interaction portion and comprising a leg joined to said arms at a waveguide junction, the Q of said interaction portion being higher than 500 and at least twice the Q of said leg portion, whereby the total Q of said composite cavity is made substantially less than the Q of said interaction portion to render the detected atomic resonance signal less responsive to detuning effects of said resonator.

2. The apparatus according to claim 1 wherein a lossy material is disposed in said leg portion for substantially reducing the Q of the entire cavity as compared to its Q without such lossy material.

3. The apparatus according to claim 2 including a gastight wave permeable window sealed across said leg portion inbetween said waveguide junction of said cavity and said lossy material to permit evacuation of said interaction arms of said resonator whereby said lossy material is disposed externally of said evacuated portion of said resonator.

4. The apparatus according to claim 2 wherein said cavity resonator is made of sections of rectangular waveguide.

5. The apparatus according to claim 4 wherein said lossy material takes the form of a resistance card mounted across a rectangular waveguide section of said leg portion of said resonator from one broad wall to the other broad wall.

6. The apparatus according to claim 1 wherein an isolator is disposed in said leg portion.

7. The apparatus according to claim 6 including an iris disposed in said leg portion between said isolator and said waveguide junction of said cavity for determining the degree of coupling between said leg portion and said interaction portions of said cavity.

References Cited

UNITED STATES PATENTS 2,972,115   2/1961   Zacharias et al. _____ 331—3

WILLIAM F. LINDQUIST, *Primary Examiner.*